(12) United States Patent
Zhang et al.

(10) Patent No.: US 11,307,156 B2
(45) Date of Patent: Apr. 19, 2022

(54) DEVICE FOR MEASURING SECONDARY ELECTRON EMISSION COEFFICIENT

(71) Applicants: Tsinghua University, Beijing (CN); HON HAI PRECISION INDUSTRY CO., LTD., New Taipei (TW)

(72) Inventors: Ke Zhang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 100 days.

(21) Appl. No.: 16/908,987

(22) Filed: Jun. 23, 2020

(65) Prior Publication Data
US 2021/0293731 A1   Sep. 23, 2021

(30) Foreign Application Priority Data
Mar. 19, 2020   (CN) .......................... 202010198334.X

(51) Int. Cl.
*G01N 23/2251*   (2018.01)
(52) U.S. Cl.
CPC ..... *G01N 23/2251* (2013.01); *G01N 2223/07* (2013.01); *G01N 2223/507* (2013.01)
(58) Field of Classification Search
CPC .......... H01J 37/00; H01J 37/02; H01J 37/023; H01J 37/05; H01J 37/10; H01J 37/147; H01J 37/153; H01J 37/22; H01J 37/222; H01J 37/224; H01J 37/24; H01J 37/244; H01J 37/252; H01J 37/256; H01J 37/26; H01J 37/261; H01J 37/28; G01N 23/2251; G01N 2223/07; G01N 2223/507
USPC .......................................... 250/306, 307, 311
See application file for complete search history.

(56) References Cited

U.S. PATENT DOCUMENTS

| | | | |
|---|---|---|---|
| 4,697,080 A * | 9/1987 | King .................. | G01N 23/2251 250/307 |
| 2005/0030044 A1* | 2/2005 | Correale ................. | G01L 21/34 324/460 |

* cited by examiner

*Primary Examiner* — Jason L McCormack
(74) *Attorney, Agent, or Firm* — ScienBiziP, P.C.

(57) ABSTRACT

A device for measuring a secondary electron emission coefficient comprises a scanning electron microscope, a first collecting plate, a second collecting plate, a first galvanometer, a second galvanometer, a voltmeter, and a Faraday cup. The scanning electron microscope comprises an electron emitter and a chamber. A sample is located between the first collecting plate and the second collecting plate. The first galvanometer is used to test a current intensity of electrons escaping from the sample and hitting the first collecting plate and the second collecting plate. A high-energy electron beam emitted by the electron emitter passes through the first collecting plate and the second collecting plate, and enters the Faraday cup. The second galvanometer is used to test a current intensity of electrons entering the Faraday cup.

16 Claims, 5 Drawing Sheets providing the device for measuring secondary electron emission coefficient, emitting the high-energy electron beam by the electron emitter; the high-energy electron beam passing through the first through hole, the second through hole, and the electron inlet in sequence, and then entering the Faraday cup and forming an injection current $I_{injection\ current}$; and measuring the injection current $I_{injection\ current}$ using the second galvanometer; — S1 short-circuiting the first collecting plate and the second collecting plate; placing the tested sample between the first collecting plate and the second collecting plate; and applying a 50 volt positive voltage between the tested sample and the first collecting plate, wherein a voltage of the tested sample is positive relative to a voltage of the first collecting plate, now the secondary electrons can not escape from the tested sample, and a secondary electron signal can not be collected on the first collecting plate and the second collecting plate, a current $I_{SE}$ formed by the secondary electrons is 0; measuring a current $I_1$ between the tested sample and the first collecting plate by the first galvanometer, and ignoring a background current $I_{BG1}$ of the first galvanometer; and according to formula $I_1=I_{BG1}+I_{others}+I_{SE}$, obtaining a current $I_{others}$ of other electrons excluding the secondary electrons; — S2 keeping the first collecting plate and the second collecting plate short-circuited, and applying a positive voltage between the first collecting plate and the tested sample, wherein the voltage of the first collecting plate is positive relative to the voltage of the tested sample; measuring a current $I_2$ between the first collecting plate and the tested sample using the first galvanometer, and ignoring a background current $I_{BG2}$ of the first galvanometer; and obtaining a current $I_{SE}$ formed by the secondary electrons according to formula $I_2 = I_{BG2} + I_{others} + I_{SE}$; — S3 obtaining the secondary electron emission coefficient $\delta$ according to formula $\delta = \dfrac{I_{SE}}{I_{injection\ current}}$ — S4

FIG. 2

DEVICE FOR MEASURING SECONDARY ELECTRON EMISSION COEFFICIENT

CROSS-REFERENCE TO RELATED APPLICATIONS

This application claims all benefits accruing under 35 U.S.C. § 119 from China Patent Application No. 202010198334.X, filed on Mar. 19, 2020, in the China Intellectual Property Office, the contents of which are hereby incorporated by reference. The application is also related to co-pending applications entitled, "METHOD FOR MEASURING SECONDARY ELECTRON EMISSION COEFFICIENT", filed Jun. 23, 2020 Ser. No. 16/908,982.

FIELD

The present disclosure relates to a device for measuring a secondary electron emission coefficient.

BACKGROUND

Secondary electron emission refers to a process of bombarding a surface of an object with an electron flow or an ion flow to emit electrons. The emitted electrons are called secondary electrons. The secondary electrons are generally emitted in a depth range of 5 nanometers to 10 nanometers on a surface layer. The secondary electrons are very sensitive to a surface morphology of a sample. Therefore, a secondary electron emission phenomenon can effectively display the surface morphology of the sample. A secondary electron principle is applied to detecting elements such as electron multiplier tubes, photomultiplier tubes, microchannel plates, Faraday cups, and Daly detectors. The secondary electron principle is also applied to electronic imaging elements such as scanning electron microscope. With a rapid development of an electronic technology, the secondary electron emission phenomenon has attracted more and more attention.

A secondary electron emission coefficient is a ratio of emitted secondary electrons to injected electrons. The secondary electron emission coefficient is an important physical parameter to measure the secondary electron emission phenomenon. The requirements for the secondary electron emission coefficient are different in different situations. For example, in photomultiplier tubes and electron multipliers, the larger the secondary electron emission coefficient, the better. However, in grid-controlled electron tubes and high-voltage electron tubes, the smaller the secondary electron emission coefficient, the better; and it is best not to cause the secondary electron emission. Therefore, a device for measuring the secondary electron emission coefficient requires high accuracy.

However, conventional devices for measuring the secondary electron emission coefficient cannot remove the low-energy electrons generated from the surface layer by other means during the measurement, the low-energy electrons are called pseudo-secondary electrons. That is, the conventional devices for measuring the secondary electron emission coefficient cannot distinguish between the pseudo-secondary electrons and the secondary electrons. Therefore, the accuracy of the conventional devices for measuring the secondary electron emission coefficient is low. Furthermore, the conventional devices for measuring the secondary electron emission coefficient can only measure the secondary electron emission coefficient of three-dimensional body materials with large size.

BRIEF DESCRIPTION OF THE DRAWINGS

Implementations of the present technology will now be described, by way of example only, with reference to the attached figures, wherein:

FIG. 2 is a flow diagram of one embodiment of a method for measuring the secondary electron emission coefficient.

DETAILED DESCRIPTION

Figure 1:
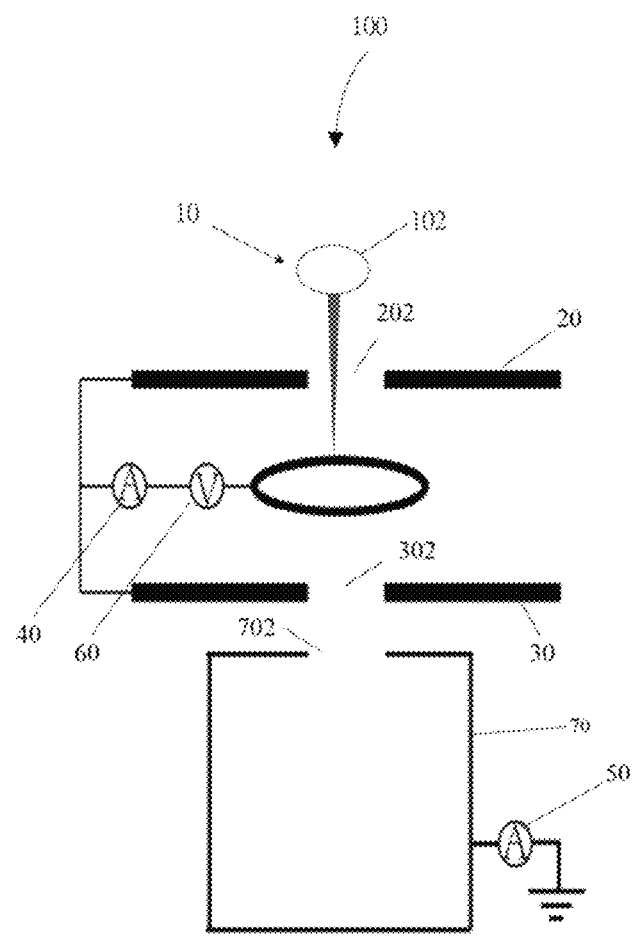
FIG. 1 is a structural diagram of one embodiment of a device for measuring a secondary electron emission coefficient.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Referring to FIG. 1, one embodiment is described in relation to a device 100 for measuring a secondary electron emission coefficient. The device 100 comprises a scanning electron microscope 10, a first collecting plate 20, a second collecting plate 30, a first galvanometer 40, a second galvanometer 50, a voltmeter 60, and a Faraday cup 70.

The scanning electron microscope 10 comprises an electron emitter 102, and the electron emitter 102 is used to emit a high-energy electron beam. The first collecting plate 20 comprises a first through hole 202. The second collecting plate 30 comprises a second through hole 302. The Faraday cup 70 comprises an electron inlet 702. The first through hole 202, the second through hole 302, and the electron inlet 702 penetrate through with each other. The first collecting plate 20 and the second collecting plate 30 are located in a chamber of the scanning electron microscope 10. The first collecting plate 20 and the second collecting plate 30 are parallel with and spaced apart from each other. The first collecting plate 20 and the second collecting plate 30 are both used to collect electrons. The first galvanometer 40 comprises a first terminal and a second terminal. When the device 100 is working, a tested sample is located between the first collecting plate 20 and the second collecting plate 30, the first terminal is connected to the first collecting plate 20, and the second terminal is connected to the tested sample. When the high-energy electron beam hits the tested sample, there are electrons escaping from a surface of the tested sample; the first galvanometer 40 is used to test a current intensity of electrons hitting the first collecting plate 20 and the second collecting plate 30 from the electrons escaping from the surface of the tested sample. The voltmeter 60 comprises a third terminal and a fourth terminal. The third terminal is connected to the first collecting plate 20, and the fourth terminal is connected to the tested sample. The voltmeter 60 is used to test a voltage difference between the first collecting plate 20 and the tested sample. The Faraday cup 70 is located in the chamber of the scanning electron microscope 10. A first end of the second galvanometer 50 is connected to the Faraday cup 70, and a second end of the second galvanometer 50 is grounded. The second galvanometer 50 is used to test a current intensity of electrons entering the Faraday cup 70 after the high-energy electron beam passing through the first through hole 202, the second through hole 302, and the electron inlet 702.

A model of the scanning electron microscope 10 is not limited. In embodiment, the scanning electron microscope 10 is FEI Nova 450. A diameter of the high-energy electron beam emitted by the electron emitter 102 is limited according to actual needs. Since a diameter of a focused beam pot of the high-energy electron beam can be several nanometers, the device 100 can measure an electron emission coefficient of a small local area of the tested sample. For example, the diameter of the focused beam pot of the high-energy electron beam can be ranged from about 1.0 nanometer to about 10 nanometers. Therefore, the device 100 can measure a secondary electron emission coefficient of the tested sample with a small area. The device 100 can measure the secondary electron emission coefficient of nano-sized two-dimensional materials, which overcomes a problem that the conventional devices can only measure a secondary electron emission coefficient of three-dimensional body materials with large sizes. For example, the device 100 can measure a secondary electron emission coefficient of a two-dimensional material with an area of less than 100 square nanometers. In some embodiments, the device 100 can measure a secondary electron emission coefficient of a two-dimensional material with an area greater than or equal to 10 square nanometers and less than 50 square nanometers. In one embodiment, the tested sample is a macroscopic two-dimensional metal molybdenum. In one embodiment, the diameter of the focused beam pot of the high-energy electron beam emitted by the electron emitter 102 is 10 nanometers.

A size of the first collecting plate 20 can be designed according to actual needs. A material of the first collecting plate 20 is a conductive material, such as metal, conductive polymer, antimony tin oxide (ATO), graphite and indium tin oxide (ITO). In one embodiment, the first collecting plate 20 is a copper plate, and a shape of the copper plate is square with a side length of 1.5 cm.

A size of the second collecting plate 30 can be designed according to actual needs. A material of the second collecting plate 30 is a conductive material, such as metal, conductive polymer, antimony tin oxide (ATO), graphite and indium tin oxide (ITO). The size and the material of the second collecting plate 30 and the size and the material of the first collecting plate 20 can be the same or different. In one embodiment, the second collecting plate 30 is a copper plate, and a shape of the copper plate is square with a side length of 1.5 cm. The first through hole 202 and the second through hole 302 are penetrated through with each other, therefore, the high-energy electron beams emitted by the electron emitter 102 can sequentially pass through the first through hole 202 and the second through hole 302 and enter the Faraday cup 70. A separation distance between the second collecting plate 30 and the first collecting plate 20 is defined according to actual needs. In one embodiment, the separation distance between the second collecting plate 30 and the first collecting plate 20 is greater than or equal to 80 micrometers and less than or equal to 120 micrometers. In one embodiment, the separation distance between the second collecting plate 30 and the first collecting plate 20 is 100 micrometers.

Since the two-dimensional material is generally a single atomic layer or several atomic layers, when the two-dimensional material is bombarded with the high-energy electron beam, secondary electrons will escape from both an upper surface and a lower surface of the two-dimensional material. In the present disclosure, the first collecting plate 20 and the second collecting plate 30 are arranged oppositely. When measuring the secondary electron emission coefficient of the two-dimensional material, the two-dimensional material is placed between the first collecting plate 20 and the second collecting plate 30, all the secondary electrons can be collected by shorting the first collecting plate 20 and the second collecting plate 30. A situation that the secondary electrons are leaked can be avoided, thereby improving a measurement accuracy of the device 100.

The first galvanometer 40, the second galvanometer 50, and the voltmeter 60 can be integrated into a source meter, or a separate galvanometer and voltmeter can be used. In one embodiment, the first galvanometer 40, the second galvanometer 50, and the voltmeter 60 are integrated into a source meter, and a model of the source meter is Agilent B2902A. The source meter is not limited to the Agilent B2902A, and can also be other existing source meters.

When the first galvanometer 40 and the second galvanometer 50 use separate galvanometers, the first galvanometer 40 and the second galvanometer 50 can be existing galvanometers. As long as the first galvanometer 40 can test the current intensity of the electrons hitting the first collecting plate 20 and the second collecting plate 30 from the tested sample. The second galvanometer 50 can measure an injection current formed by the high-energy electron beam passing through the first collecting plate 20 and the second collecting plate 30 into the Faraday cup 70 in sequence. The voltmeter 60 can be any existing voltmeter, as long as the voltage difference between the first collecting plate 20 and the tested sample can be measured.

In one embodiment, the device 100 further comprises a voltage supply unit (no shown). The voltage supply unit is used to apply a voltage between the tested sample and the first collecting plate 20. In one embodiment, the voltage supply unit is an external power supply.

In one embodiment, the device 100 further comprises a fixing element (not shown). The fixing element is used to fix the tested sample between the first collecting plate 20 and the second collecting plate 30.

The device 100 for measuring the secondary electron emission coefficient of the present disclosure has advantages as follows:

The device 100 can measure the secondary electron emission coefficient of nano-sized two-dimensional materials, which overcomes the problem that the conventional devices can only measure the secondary electron emission coefficient of three-dimensional body materials with large sizes.

The device 100 can accurately distinguish the secondary electronic signal from other signals by applying a voltage of 50 eV between the first collecting plate 20 and the second collecting plate 30; and the device 100 can also obtain the current of other electrons excluding the secondary electrons escaping from the tested sample surface after the tested sample is hit by the high-energy electron beam. The pseudo-secondary electron signal can be eliminated by adjusting the voltage between the first collecting plate 20 and the second collecting plate 30 again, and a system of "net" secondary electron signals can be obtained, thereby obtaining an accurate secondary electron emission coefficient.

In the present disclosure, the first collecting plate 20 and the second collecting plate 30 are arranged oppositely. When measuring the secondary electron emission coefficient of the two-dimensional material, the two-dimensional material is placed between the first collecting plate 20 and the second collecting plate 30, all the secondary electrons can be collected by shorting the first collecting plate 20 and the second collecting plate 30. A situation that the secondary electrons are leaked can be avoided, thereby improving a measurement accuracy of the device 100.

A signal-to-noise ratio of the device 100 is relatively low, and the device 100 does not require carbon deposition on the surface of the tested sample, which overcomes a problem that the carbon on the surface of the tested sample affects the measurement accuracy of the secondary electron emission coefficient. That is, the surface of the tested sample is free of carbon. Furthermore, the device 100 has reasonable electrical design and simple structure.

Referring to FIG. 2, one embodiment is described in relation to a method for measuring the secondary electron emission coefficient. The method for measuring the secondary electron emission coefficient is implemented using the device 100 for measuring the secondary electron emission coefficient.

The method for measuring the secondary electron emission coefficient comprises steps of:

S1, providing the device 100 for measuring the secondary electron emission coefficient, emitting the high-energy electron beam by the electron emitter 102; the high-energy electron beam passing through the first through hole 202, the second through hole 302, and the electron inlet 702 in sequence, and then entering the Faraday cup 70 and forming an injection current $I_{injection\ current}$; and measuring the injection current $I_{injection\ current}$ using the second galvanometer 50;

S2, short-circuiting the first collecting plate 20 and the second collecting plate 30; placing the tested sample between the first collecting plate 20 and the second collecting plate 30; and applying a 50 volt positive voltage between the tested sample and the first collecting plate 20, wherein a voltage of the tested sample is positive relative to a voltage of the first collecting plate 20, now the secondary electrons cannot escape from the tested sample, and a secondary electron signal can not be collected on the first collecting plate 20 and the second collecting plate 30, a current $I_{SE}$ formed by the secondary electrons is 0; measuring a current $I_1$ between the tested sample and the first collecting plate 20 by the first galvanometer 40, and ignoring a background current $I_{BG1}$ of the first galvanometer 40; and according to formula $I_1 = I_{BG1} + I_{others} + I_{SE}$, obtaining a current $I_{others}$ of other electrons excluding the secondary electrons;

S3, keeping the first collecting plate 20 and the second collecting plate 30 short-circuited, and applying a positive voltage between the first collecting plate 20 and the tested sample, wherein the voltage of the first collecting plate 20 is positive relative to the voltage of the tested sample; measuring a current $I_2$ between the first collecting plate 20 and the tested sample using the first galvanometer 40, and ignoring a background current $I_{BG2}$ of the first galvanometer 40; and obtaining a current $I_{SE}$ formed by the secondary electrons according to formula $I_2 = I_{BG2} + I_{others} + I_{SE}$; and S4, obtaining the secondary electron emission coefficient δ according to formula $$\delta = \frac{I_{SE}}{I_{injection\ current}}.$$

In step S1, the injection current $I_{injection\ current}$ is related to an energy of the high-energy electron beam. In one embodiment, a diameter of a focused beam spot of the high-energy electron beam is 10 nanometers, and the injection current $I_{injection\ current}$ is about 300 pA. The diameter of the focused beam spot of the high-energy electron beam and the injection current $I_{injection\ current}$ are not to be strictly limited to this embodiment, and can be selected according to the actual situation.

Since the diameter of the focused beam pot of the high-energy electron beam emitted by the electron emitter 102 can reach several nanometers, the method for measuring the secondary electron emission coefficient can measure an electron emission coefficient of a small local area of the tested sample. Therefore, the method for measuring the secondary electron emission coefficient can measure a secondary electron emission coefficient of the tested sample with a small area. The method for measuring the secondary electron emission coefficient can measure the secondary electron emission coefficient of nano-sized two-dimensional materials, which overcomes a problem that the conventional methods can only measure the secondary electron emission coefficient of three-dimensional body materials with large sizes. For example, the method for measuring the secondary electron emission coefficient can measure a secondary electron emission coefficient of a two-dimensional material with an area of less than 100 square nanometers. In some embodiments, the method for measuring the secondary electron emission coefficient can measure a secondary electron emission coefficient of a two-dimensional material with an area greater than or equal to 10 square nanometers and less than 50 square nanometers.

In step S2, in one embodiment, the tested sample is a macroscopic two-dimensional metal molybdenum. The first collecting plate 20 and the second collecting plate 30 are short-circuited by a conducting wire.

In a broader sense, electrons with energy less than 50 eV are called secondary electrons, and electrons with energy greater than 50 eV are not the secondary electrons. Therefore, when a 50 volt voltage is applied between the tested sample and the first collecting plate 20, the generated secondary electrons cannot escape from the tested sample. Now, secondary electronic signals cannot be collected on the first collecting plate 20 and the second collecting plate 30. That is, the current $I_{SE}$ formed by the secondary electron is theoretically 0. Further the background current $I_{BG1}$ is negligible, the current $I_1$ between the tested sample and the first collecting plate 20 can be read by the first galvanometer 40. The current $I_{others}$ of other electrons excluding the secondary electrons can be obtained according to formula $I_1 = I_{BG1} + I_{others} + I_{SE}$.

In one embodiment, a positive voltage of 50 volts is applied between the tested sample and the first collecting plate 20, wherein the voltage of the first collecting plate 20 is 0V, and the voltage of the tested sample is 50 volts. The positive voltage applied between the tested sample and the first collecting plate 20 is read by the voltmeter 60.

In step S3, the first collecting plate 20 and the second collecting plate 30 can be kept short-circuited by the conducting wire in step S2. Applying the positive voltage between the first collecting plate 20 and the tested sample, and the positive voltage is a voltage when the current $I_2$ between the first collecting plate 20 and the tested sample reaches saturation. As the positive voltage applied between the first collecting plate 20 and the tested sample, the current $I_2$ will increase first and then remain unchanged. The current $I_2$ reaches saturation means that the current $I_2$ no longer increases with the increase of the positive voltage applied between the first collecting plate 20 and the tested sample. Even if the positive voltage applied between the first collecting plate 20 and the tested sample continues to increase, the current $I_2$ between the first collecting plate 20 and the tested sample will not change anymore. A reason is that as the applied positive voltage increases, the secondary electrons collected by the first collecting plate 20 and the second collecting plate 30 gradually increase, and thus the current $I_2$ between the first collecting plate 20 and the tested sample gradually increases. After the generated secondary electrons are completely collected by the first collecting plate 20 and the second collecting plate 30, even if the positive voltage applied between the first collecting plate 20 and the tested sample continues to increase, the current $I_2$ between the first collecting plate 20 and the tested sample will no longer change, the current $I_2$ reaches saturation, and the positive voltage at this time is defined as the positive voltage in step S3. In one embodiment, when the positive voltage between the first collecting plate 20 and the tested sample is about 20V, the current $I_2$ between the first collecting plate 20 and the tested sample reaches saturation.

In one embodiment, the positive voltage is applied between the first collecting plate 20 and the tested sample, and a voltage of the tested sample is 0V. The voltage of the tested sample is not limited to 0V, as long as the positive voltage applied between the first collecting plate 20 and the tested sample can make the current $I_2$ reach saturation. The positive voltage applied between the first collecting plate 20 and the tested sample is read by the voltmeter 60. A voltage supply unit is used to apply the positive voltage of 50 volts between the tested sample and the first collecting plate 20 in step S2, and the positive voltage between the first collecting plate 20 and the tested sample in step S3. In one embodiment, the voltage supply unit is an external power supply.

Figure 3:
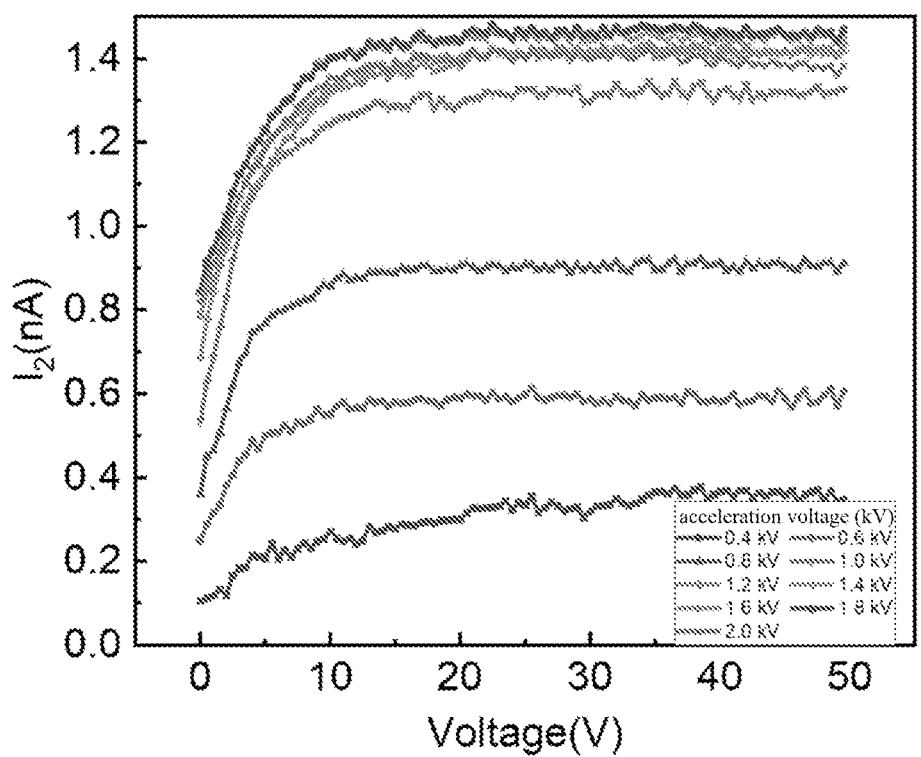
FIG. 3 shows a variation curve of a current $I_2$ between a first collecting plate and a tested sample with a positive voltage applied between the first collecting plate and the tested sample under different acceleration voltages using the method in FIG. 2.

FIG. 3 shows a variation curve of one embodiment of the current $I_2$ with the positive voltage applied between the first collecting plate 20 and the tested sample under different acceleration voltages. It can be seen that, as the applied positive voltage increases, the current $I_2$ gradually increases; when the applied positive voltage is about 20V, the current $I_2$ reaches saturation. It can also be seen that, when a same positive voltage is applied between the first collecting plate 20 and the tested sample, the higher the acceleration voltage, the greater the current $I_2$ between the first collecting plate 20 and the tested sample. The reason is that the energy of the electron beam is correspondingly high at a high acceleration voltage, when the electron beam hits to the surface of the tested sample, an action distance is large and the number of secondary electrons generated is also large.

Figure 4:
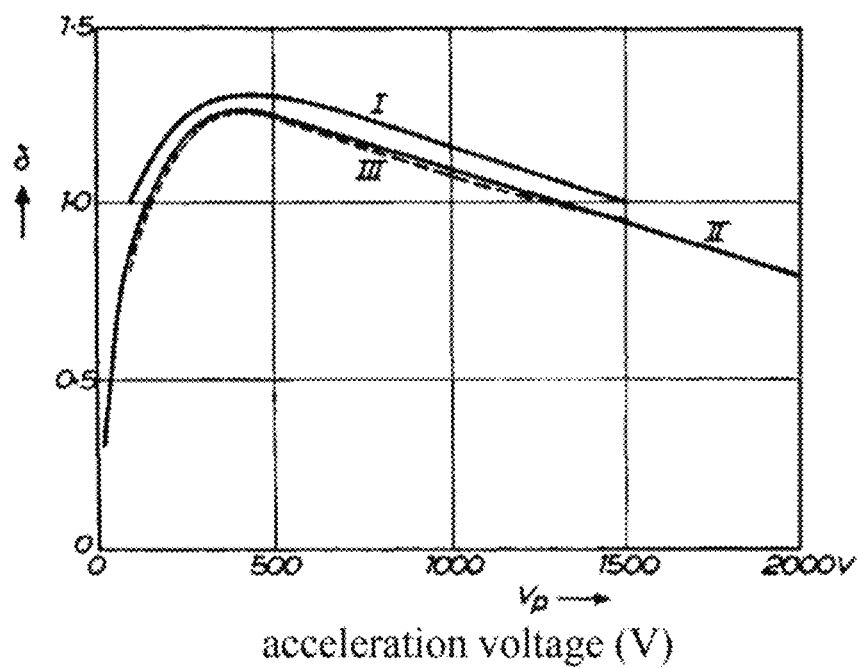
FIG. 4 is a secondary electron emission coefficient of metal molybdenum under different acceleration voltages obtained by a conventional method.
Figure 5:
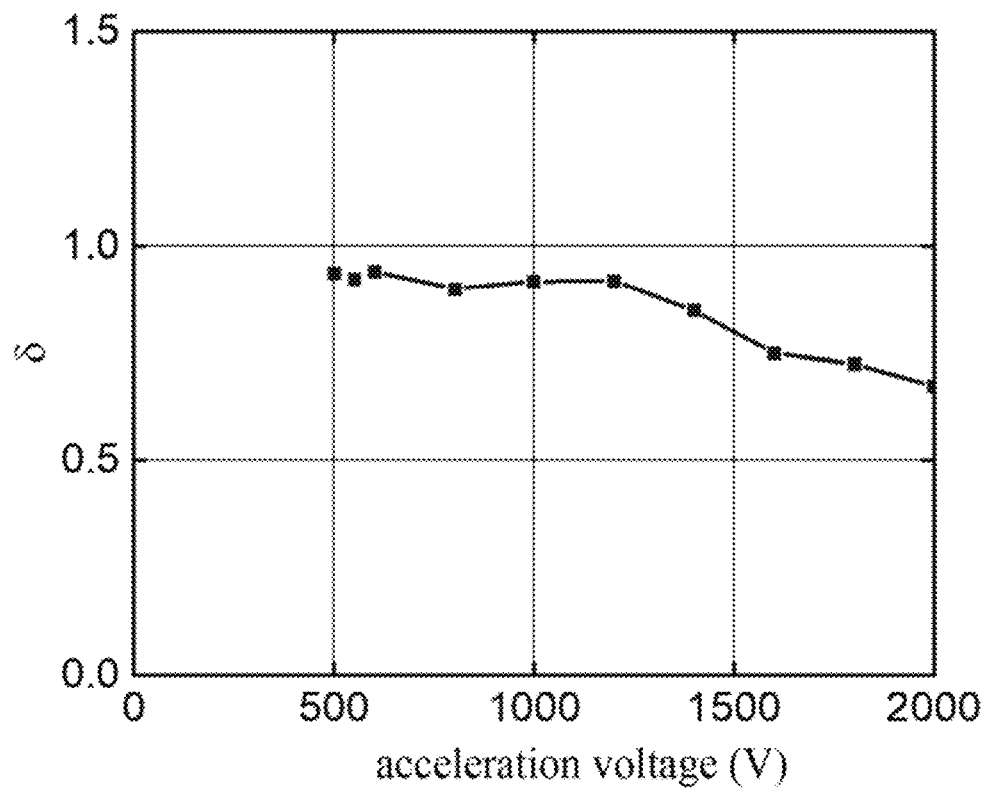
FIG. 5 is a secondary electron emission coefficient of metal molybdenum under different acceleration voltages obtained by the method in FIG. 2.

FIG. 4 is a secondary electron emission coefficient of metal molybdenum under different acceleration voltages obtained by a conventional method. FIG. 5 is a secondary electron emission coefficient of metal molybdenum under different acceleration voltages obtained by the method of one embodiment of the present disclosure. Comparing FIG. 4 and FIG. 5, it can be seen that at the same acceleration voltage, the secondary electron emission coefficient of the metallic molybdenum obtained by the method of the present disclosure is smaller than that obtained by the conventional method. The reason is that the method of the present disclosure removes the pseudo-secondary electrons escaping from the surface of the tested sample produced by other means; and there is no carbon on the surface of the tested sample of the present disclosure, thereby avoiding the influence on the secondary electron emission coefficient by carbon deposition on the surface of the tested sample. Therefore, the method for measuring the secondary electron emission coefficient of the present disclosure is more accurate than the conventional method.

The method for measuring the secondary electron emission coefficient of the present disclosure has advantages as follows:

The method for measuring the secondary electron emission coefficient can measure the secondary electron emission coefficient of nano-sized two-dimensional materials, which overcomes the problem that the conventional methods can only measure the secondary electron emission coefficient of three-dimensional body materials with large sizes.

The method for measuring the secondary electron emission coefficient can accurately distinguish the secondary electronic signal from other signals by applying a voltage of 50 eV between the first collecting plate and the second collecting plate; and the method for measuring the secondary electron emission coefficient can also obtain the current of other electrons excluding the secondary electrons escaping from the tested sample surface after the tested sample is hit by the high-energy electron beam. The pseudo-secondary electron signal can be eliminated by adjusting the voltage between the first collecting plate and the second collecting plate again, and a system of "net" secondary electron signals can be obtained, thereby obtaining an accurate secondary electron emission coefficient.

In the present disclosure, the first collecting plate and the second collecting plate are arranged oppositely. When measuring the secondary electron emission coefficient of the two-dimensional material, the two-dimensional material is placed between the first collecting plate and the second collecting plate; all the secondary electrons can be collected by shorting the first collecting plate and the second collecting plate. A situation that secondary electrons are leaked can be avoided, thereby improving a measurement accuracy of the method.

The method for measuring the secondary electron emission coefficient does not require carbon deposition on the surface of the tested sample, which overcomes a problem that the carbon on the surface of the tested sample affects the measurement accuracy of the secondary electron emission coefficient.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A device for measuring a secondary electron emission coefficient, the device comprising:
    a scanning electron microscope comprising an electron emitter and a chamber, wherein the electron emitter is configured to emit a high-energy electron beam;
    a first collecting plate located in the chamber and comprising a first through hole;
    a second collecting plate located in the chamber and comprising a second through hole, wherein the first collecting plate and the second collecting plate are parallel with and spaced apart from each other, and a tested sample is located between the first collecting plate and the second collecting plate;
    a first galvanometer comprising a first terminal and a second terminal and configured to test a current intensity of electrons, wherein the first terminal is connected to the first collecting plate, and the second terminal is connected to the tested sample; and the electrons escape from a surface of the tested sample and hit the first collecting plate and the second collecting plate, after the high-energy electron beam hits the tested sample;
    a Faraday cup located in the chamber and comprising an electron inlet, wherein the first through hole, the second through hole, and the electron inlet penetrate through with each other, the high-energy electron beam passes through the first through hole, the second through hole, and the electron inlet, and then enters the Faraday cup;
    a second galvanometer configured to test a current intensity of electrons entering the Faraday cup, wherein a first end of the second galvanometer is connected to the Faraday cup, and a second end of the second galvanometer is grounded; and
    a voltmeter comprising a third terminal and a fourth terminal and configured to test a voltage difference between the first collecting plate and the tested sample, wherein the third terminal is connected to the first collecting plate, and the fourth terminal is connected to the tested sample.

2. The device of claim 1, wherein the tested sample is a nano-sized two-dimensional material.

3. The device of claim 2, wherein an area of the tested sample is greater than or equal to 10 square nanometers and less than 50 square nanometers.

4. The device of claim 1, wherein the tested sample is a two-dimensional metal molybdenum.

5. The device of claim 1, wherein a diameter of a focused beam pot of the high-energy electron beam is ranged from 1.0 nanometer to 10 nanometers.

6. The device of claim 1, wherein a material of the first collecting plate is metal, conductive polymer, antimony tin oxide, graphite or and indium tin oxide.

7. The device of claim 1, wherein the first collecting plate is a copper plate.

8. The device of claim 1, wherein a material of the second collecting plate is metal, conductive polymer, antimony tin oxide, graphite or indium tin oxide.

9. The device of claim 1, wherein the second collecting plate is a copper plate.

10. The device of claim 1, wherein a separation distance between the second collecting plate and the first collecting plate is greater than or equal to 80 micrometers and less than or equal to 120 micrometers.

11. The device of claim 10, wherein the separation distance between the second collecting plate and the first collecting plate is 100 micrometers.

12. The device of claim 1, wherein the first galvanometer, the second galvanometer, and the voltmeter are integrated into a source meter.

13. The device of claim 1, further comprising a voltage supply unit configured to apply a voltage between the tested sample and the first collecting plate.

14. The device of claim 13, wherein the voltage supply unit is an external power supply.

15. The device of claim 1, further comprising a fixing element configured to fix the tested sample between the first collecting plate and the second collecting plate.

16. The device of claim 1, wherein the surface of the tested sample is free of carbon.

* * * * *